(12) United States Patent
Darwhekar et al.

(10) Patent No.: US 8,824,597 B2
(45) Date of Patent: Sep. 2, 2014

(54) CIRCUITS AND METHODS FOR FIELD-BASED COMMUNICATION

(75) Inventors: Yogesh Darwhekar, Bangalore (IN); Vikas Singh, Bangalore (IN); Ronen Issac, Tel Aviv (IL); Matan Ben-Shachar, Hibat-Zion (IL)

(73) Assignee: Texas Instruments Incorporated, Dallas, TX (US)

( * ) Notice: Subject to any disclaimer, the term of this patent is extended or adjusted under 35 U.S.C. 154(b) by 180 days.

(21) Appl. No.: 13/606,415

(22) Filed: Sep. 7, 2012

(65) Prior Publication Data

US 2014/0070850 A1 Mar. 13, 2014

(51) Int. Cl.
*H04L 27/00* (2006.01)

(52) U.S. Cl.
USPC ............ 375/316; 375/377; 327/50; 327/77; 455/41.1

(58) Field of Classification Search
USPC .......... 375/316, 340, 377; 327/50, 74, 77, 90; 455/41.1
See application file for complete search history.

(56) References Cited

U.S. PATENT DOCUMENTS

| | | |
|---|---|---|
| 2004/0135673 A1 | 7/2004 | Oberhuber et al. |
| 2010/0084467 A1 | 4/2010 | Nishido |
| 2010/0181961 A1* | 7/2010 | Novak et al. ................ 320/108 |
| 2012/0178367 A1 | 7/2012 | Matsumoto et al. |
| 2012/0208459 A1 | 8/2012 | Burtt |
| 2013/0043835 A1* | 2/2013 | Yoon ............................ 320/108 |

FOREIGN PATENT DOCUMENTS

KR 101149680 5/2012

* cited by examiner

*Primary Examiner* — Dac Ha
(74) *Attorney, Agent, or Firm* — Ronald O. Neerings; Frederick J. Telecky, Jr.

(57) ABSTRACT

Several circuits and methods for field-based communication are provided. In an embodiment, a field-based communication circuit includes a receiver circuit, a detection circuit and a control circuit. The receiver circuit is configured to receive a field input signal from a field source. The detection circuit includes a voltage detection circuit and a current detection circuit configured to detect a voltage signal and a current signal, respectively associated with the field input signal. The control circuit is configured to trigger a selection of one of the voltage detection circuit and the current detection circuit based on a detection of a signal magnitude of one of the voltage signal and the current signal relative to at least a first predetermined threshold level, wherein the selection of one of the voltage detection circuit and the current detection circuit facilitates a demodulation of one of the voltage signal and the current signal.

20 Claims, 9 Drawing Sheets

CIRCUITS AND METHODS FOR FIELD-BASED COMMUNICATION

TECHNICAL FIELD

The present disclosure generally relates to field-based communications.

BACKGROUND

It is noted that a rapid technological advancement related to communication technology may result in an exponential growth in tools related to content exchange in communication systems. Indeed, one exemplary scenario provides that a user may utilize a field-based communication technology to facilitate information swapping or sharing between communication devices by merely touching the devices or bringing the devices near to one another. To illustrate, consider the example where a field-based communication tool includes near field communication (NFC) technology. The NFC technology may be implemented, for example, to facilitate financial transactions and transfer text messages, images, uniform resource locators (URLs), multimedia content and other such data between communication devices that are located in close proximity with one another.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

Various circuits and methods for field-based communication are disclosed. In an embodiment, the circuit includes a receiver circuit, a detection circuit and a control circuit. In an embodiment, the receiver circuit is configured to receive a field input signal from a field source. In an embodiment, the detection circuit is communicatively associated or coupled with the receiver circuit. In an embodiment, the detection circuit includes a voltage detection circuit and a current detection circuit. In an embodiment, the voltage detection circuit and the current detection circuit are communicatively associated or coupled with the receiver circuit. In an embodiment, the voltage detection circuit is configured to detect a voltage signal associated with the field input signal. The current detection circuit is configured to detect a current signal associated with the field input signal. In an embodiment, the control circuit is communicatively associated or coupled with the detection circuit and configured to estimate first and second signal magnitudes corresponding to the voltage and current signals, respectively. The control circuit is also configured to compare the first and second signal magnitudes with at least a first predetermined threshold level to thereby conduct a signal comparison. The control circuit is also configured to trigger a selection of one of the voltage detection circuit and the current detection circuit based on the signal comparison such that the selection facilitates a demodulation of one of the voltage signal and the current signal.

Additionally, in an embodiment, a method of field-based communication is disclosed. In an embodiment, the method includes accessing a receiver circuit, a voltage detection circuit, a current detection circuit, and a control circuit, each of the voltage and current detection circuits being communicatively associated with both of the receiver and control circuits. In an embodiment, a field input signal from a field source is received at the receiver circuit. In an embodiment, one of a current detection circuit and a voltage detection circuit communicatively associated or coupled with the receiver circuit is actuated by the control circuit to determine one of a current signal and a voltage signal, wherein each of the current and voltage signals are associated or coupled with the field input signal. In an embodiment, a signal magnitude of one of the determined current signal and the determined voltage signal is estimated. In an embodiment, the signal magnitude of one of the determined current signal and the determined voltage signal is compared with a first predetermined threshold level at the control circuit. In an embodiment, a selection of one of the voltage detection circuit and the current detection circuit is triggered. In an embodiment, the selection of the voltage detection circuit is triggered upon, subsequent to, or based on a determination that the signal magnitude of one of the detected current signal and the detected voltage signal is one of lesser than and equal to the first predetermined threshold level. In an embodiment, the selection of the current detection circuit is triggered upon, subsequent to, or based on a determination that the signal magnitude of one of the detected current signal and the detected voltage signal is greater than the first predetermined threshold level.

Moreover, in an embodiment, a circuit for field-based communication is disclosed. The circuit includes a receiver circuit, a detection circuit, and a control circuit. The receiver circuit is configured to receive a field input signal from a field source. In an embodiment, the detection circuit is communicatively associated or coupled with the receiver circuit. In an embodiment, the detection circuit includes a voltage detection circuit and a current detection circuit. In an embodiment, the voltage detection circuit and the current detection circuit is communicatively associated or coupled with the receiver circuit. The voltage detection circuit is configured to detect a voltage signal associated with the field input signal. The current detection circuit is configured to detect a current signal associated with the field input signal. In an embodiment, the current detection circuit includes a current control circuit configured to attenuate the current signal. In an embodiment, the control circuit is communicatively associated or coupled with the detection circuit and is configured to estimate a first signal magnitude and a second signal magnitude corresponding to the voltage and current signals, respectively. In an embodiment, the control circuit is configured to compare the first signal magnitude and the second signal magnitude with at least a first predetermined threshold level to thereby conduct a signal comparison. The control circuit is configured to trigger a selection of one of the voltage detection circuit and the current detection circuit based on the signal comparison such that the selection facilitates a demodulation of one of the voltage signal and the current signal. The control circuit is configured to vary the attenuation of the detected current signal by the current control circuit based on a first reference database, and based on a triggering selection of the current detection circuit. The first reference database includes a plurality of attenuation values corresponding to a plurality of signal magnitude values, respectively, of the current signal.

DETAILED DESCRIPTION

Figure 1A:
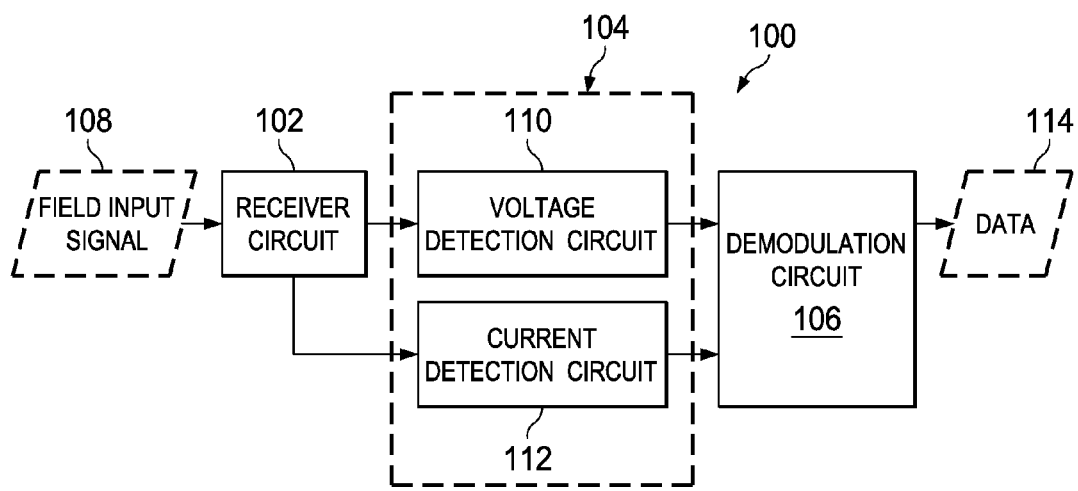
FIG. 1A illustrates an exemplary field-based communication receiver circuit in accordance with an exemplary scenario.

In the following Detailed Description, numerous specific details are set forth in order to provide a thorough understanding of the present technology. However, the present technology may be practiced without these specific details. In other instances, well-known methods, procedures, components, and circuits have not been described in detail so as to not unnecessarily obscure aspects of the exemplary embodiments presented herein. Moreover, it is noted that structures and devices are shown in block diagram form in order to avoid obscuring the disclosure.

Reference in this specification to "one embodiment" or "an embodiment" means that a particular feature, structure, or characteristic described in connection with the embodiment is included in at least one embodiment of the disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various parameters are described that may be parameters for some embodiments but not for other embodiments.

Moreover, although the following description contains many specifications for the purposes of illustration, it is noted that many variations and/or alterations to said details are within the scope of the present disclosure. Similarly, although many of the features of the present disclosure are described in terms of each other, or in conjunction with each other, it is noted that many of these features can be provided independently of other features. Accordingly, this description of the disclosure is set forth without any loss of generality to, and without imposing limitations upon, the disclosure.

Pursuant to an exemplary scenario, a field-based communication, such as, for example, near field communication (NFC), facilitates data transfer between multiple communication devices that are located in close proximity to each other. The communication devices operating in accordance with NFC communication parameters may communicate, for example, by utilizing magnetic field induction. Particularly, each of the communication devices, such as, for example, a reader device and a target device, includes or comprises antenna configured therein. When the communication devices are brought in each other's vicinity (or near-field), the reader device emits a small electric current that generates a field signal (for example, a magnetic field signal). The magnetic field of the reader device induces a magnetic field in the target device, thereby facilitating a communication between the two devices. The magnetic field received at the target device may be converted back into electrical signals to thereby enable the data transmitted by the reader device to be interpreted by the target device.

For the purpose of receiving the field input signal, the target device includes a receiver (e.g., an antenna). The received field input signal may be transformed into electrical signals such as, for example, a voltage signal or a current signal at the receiver of the target device. The voltage signal and the current signal may be detected by separate voltage detection and current detection circuits, which are each configured within the target device. A detailed block diagram of an exemplary receiver circuit incorporated within a target device in order to facilitate a near field communication is described in detail herein with reference to FIG. 1A.

FIG. 1A illustrates an exemplary field-based communication receiver circuit 100 in accordance with an exemplary scenario. The field-based communication receiver circuit 100 includes a receiver circuit 102, a detection circuit 104 and a demodulation circuit 106. The receiver circuit 102 includes, for example, an antenna and an impedance matching circuit. The receiver circuit 102 is configured to receive a field input signal 108 from a field source. Examples of the field input signal may include an electric field, a radio frequency field of a near field communication (NFC) paradigm, and the like. In an exemplary scenario, the field source may include a NFC reader device and the receiver circuit 102 may include a NFC target device such as, for example, a NFC tag.

The detection circuit 104 is communicatively associated or coupled with the receiver circuit 102. The detection circuit 104 is configured to translate the information associated with the field input signal 108 received at the receiver circuit 102 into a voltage signal or a current signal. In an exemplary scenario, the detection circuit 104 includes a voltage detection circuit 110 and a current detection circuit 112, such as where the voltage detection circuit 110 is coupled in parallel with the current detection circuit 112. The voltage detection circuit 110 may be configured to detect the voltage signal associated with the field input signal 108 and the current detection circuit 112 may be configured to detect the current signal associated with the field input signal 108.

During the field-based communications, an embodiment provides that both the voltage detection circuit 110 and the current detection circuit 112 are operational. During a low field scenario, for example, when the field source and the receiver circuit 102 are located away from one another but close enough to transmit the field input signal 108 from the field source to the receiver circuit 102, the field input signal 108 that is received by the receiver circuit 102 may have a low field strength. As a consequence, the current signal generated in the receiver circuit 102 may have relatively low signal strength, but the generated voltage signal may have relatively high signal strength, thereby allowing the voltage detection circuit 110 to perform the detection of field input signal. In addition, during a high field scenario, such as, for example, when the field source and the receiver circuit 102 are located in close proximity to one another, the field input signal 108 may have relatively high signal strength. As a consequence of the high field strength of the field input signal 108, the voltage signal generated in the receiver circuit 102 may cause saturation of the voltage detection circuit 110, and, accordingly, the current detection circuit 112 may be utilized to detect a current signal associated with the field input.

As discussed, during the low field scenario, the detection of the field input signal is performed by the voltage detection circuit. However, during the low field scenario, one or more noise signals may be generated in the current detection circuit 112 that may cause interference with the voltage detection circuit 110, thereby leading to an increase in a bit error rate of the detection circuit 110. It is noted that the term "bit error rate" may be construed as referring to a measure of an error in transmission of a plurality of bits of data from a source to a destination, such as due to noise, interference, distortion or bit synchronization errors.

When the voltage signal associated with the field input signal 108 attains a value corresponding to a saturation voltage, the voltage detection circuit 110 may saturate. Due to the saturation of the voltage detection circuit 110, the current detection circuit 112 may detect the current signal corresponding to the field input signal. The current detection circuit 112 may also saturate when a voltage equivalent of the current signal associated with the field input signal 108 attains a value equal to a saturation value of the current detection circuit 112. The saturation of the voltage detection circuit 110 and the current detection circuit 112 is described in further detail herein with reference to FIG. 1B.

The demodulation circuit 106 is communicatively associated or coupled with the detection circuit 104. The demodulation circuit 106 is configured to demodulate the detected voltage signal and/or the detected current signal output from the detection circuit 104 to thereby generate data 114 associated with the field input signal 108. The demodulation circuit 106 may be configured to amplify the detected voltage signal or the detected current signal. In an exemplary scenario, the demodulation circuit 106 amplifies the detected voltage signal or the detected current signal based on a fixed gain parameter. For example, in case the detected voltage/current signal has a low value (wherein the term "value" may refer to a magnitude of the applicable signal strength), the gain parameter applied thereto facilitates in amplifying the detected signal and retrieving the data 114. However, in certain scenarios, due to the application of the fixed gain, a high value of the gain parameter is selected for low values of the voltage signals or the voltage equivalent of the current signals. Accordingly, the fixed gain corresponding to the low values of the voltage signals may tend to be unnecessary for even the high values of the voltage signals, which may lead to undue amplification of incoming noise signals, thereby degrading the applicable signal to noise ratio (SNR).

Figure 1B:
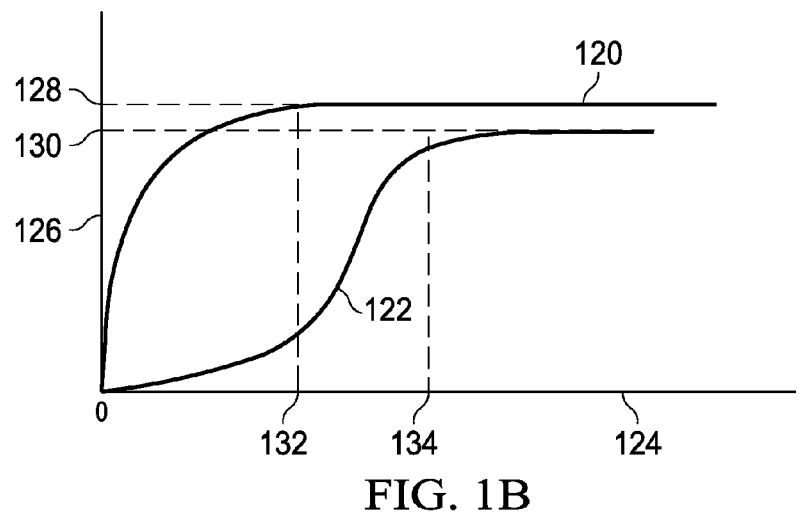
FIG. 1B depicts exemplary operational plots of voltage signal variation and current signal variation with respect to a variation of a field input signal in a field-based communication in accordance with an exemplary scenario.

FIG. 1B depicts exemplary operational plots of voltage signal variation and current signal variation with respect to a variation of a field input signal in a field-based communication in accordance with an exemplary scenario. For example, FIG. 1B illustrates a pair of exemplary operational plots, including a first plot 120 representing a variation of a measure of the field input signal 108 (e.g., in Tesla) along x-axis 124 with a measure of voltage signals (e.g., in volts) along y-axis 126, and a second plot 122 representing a variation of a measure of the field input signal 108 (e.g., in Tesla) along x-axis 124 with a measure of the voltage signals (e.g., in volts) along y-axis 126. It is noted that a reference to the current signal herein may be construed as a voltage equivalent of the current signal.

As discussed with reference to FIG. 1B, the voltage signal is generated by a voltage detection circuit, for example, the voltage detection circuit 110, while the current signal is generated by the current detection circuit, for example, the current detection circuit 112. Accordingly, it is noted that the first plot 120 may represent a variation of the voltage signal with respect to the field input signal 108 in the voltage detection circuit 110, and the second plot 122 may represent a variation of the current signal with respect to the field input signal 108 in the current detection circuit 112.

As illustrated in FIG. 1B, the first plot 120, which represents a variation of the voltage signal with the field input signal 108, begins to rise from an initial value (for example, 0) of the field input signal 108 and increases gradually until the corresponding voltage signal reaches a saturation value (indicated at a level 128 in the plot). Upon attaining the voltage saturation level 128, the voltage detection circuit 110 saturates, and, accordingly, the value of the voltage signal remains constant at the saturation level 128. It is noted that, upon reaching the voltage saturation level, the first plot 120 fails to rise even with a subsequent increase in the field input signal 108.

With reference still to FIG. 1B, the second plot 122 representing a variation of the current signal with the field input signal 108 increases gradually from an initial value of the field input signal 108 until the corresponding voltage equivalent of the current signal reaches a voltage saturation level 130 based on the applicable current. Upon reaching the saturation level 130, the current detection circuit 112 saturates. It is noted that, upon attaining the saturation level 130, the second plot 122 fails to rise beyond the saturation level 130. However, the second plot 122 continues to rise for a short interval (for example, during high field scenarios) between the field input signal values 132 and 134, before reaching the saturation level 130 even after the first plot 120 reaches the saturation level 128, thereby indicating that the current detection circuit 112 remains operational during the saturation of the voltage detection circuit 110 until the current detection circuit 112 itself reaches saturation at the saturation level 130.

In order to prevent the current detection circuit 112 from attaining the saturation during the high field scenarios, the detected current signal is attenuated by the current detection circuit 112. Particularly, a fixed level of attenuation may be applied to the current signal so as to maintain the signal magnitude of the current signal and consequently prevent the saturation of the current detection circuit. The fixed level of attenuation may include, for example, a low level of attenuation or a high level of attenuation. However, in certain scenarios, the fixed attenuation value applied to the current signal leads to a creation of 'dead zones' during the operation of the NFC receivers, such as, for example, during high field scenarios or intermediate field scenarios. The occurrence of such 'dead zones' are illustrated as a region between the first plot 120 and the second plot 122. The dead zone is illustrated and described in further detail herein with reference to FIGS. 1C and 1D.

Figure 1C:
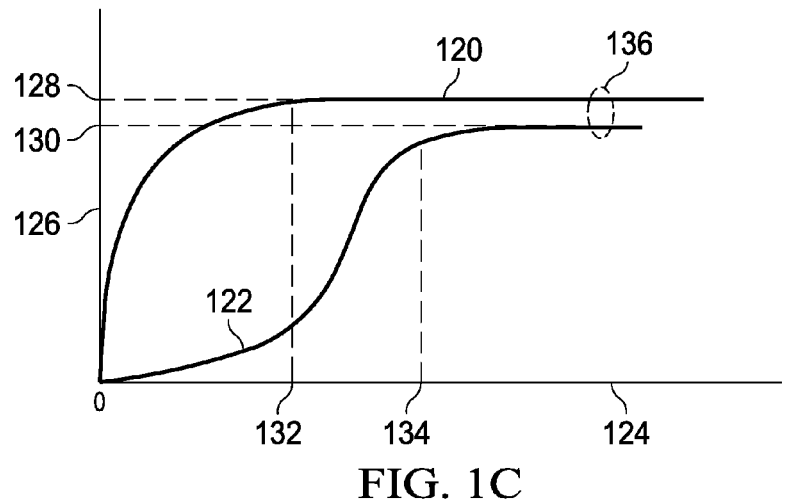
FIGS. 1C and 1D graphically depict first and second exemplary occurrences, respectively, of dead zones due to fixed attenuation in a field-based communication in accordance with an exemplary scenario.
Figure 1D:
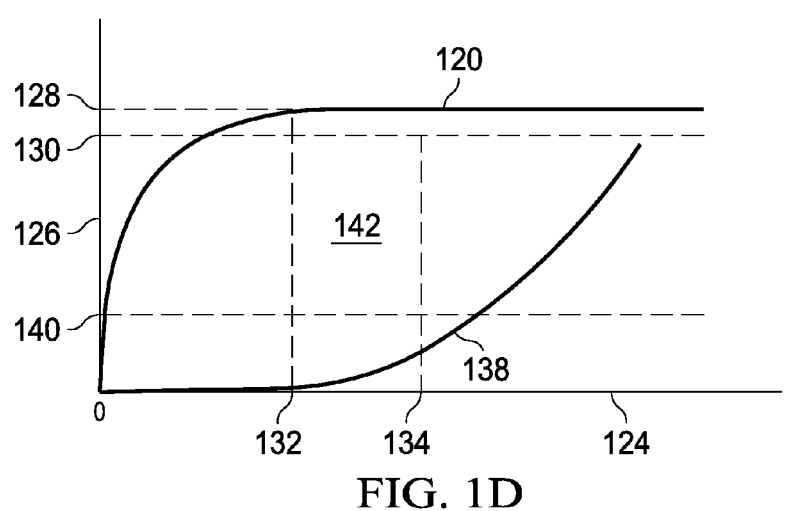

FIGS. 1C and 1D graphically depict first and second exemplary occurrences, respectively, of dead zones in a field-based communication in accordance with an exemplary scenario. More particularly, FIG. 1C depicts an occurrence of dead zones during high field scenarios, which is described herein with reference to the operation plots of FIG. 1B, in accordance with an exemplary scenario. As depicted in FIG. 1C, the second plot 122 corresponding to the current detection circuit 112 is indicative of the current signal detected by the current detection circuit 112 being subjected to a fixed low level of attenuation. Accordingly, the second plot 112 shows an exponential rise between the field input signal values 132 and 134. However, the first plot 120 and the second plot 122 attain saturation levels 128 and 130, respectively, subsequent to field input signal value 134 during high field scenarios, which is indicative of a saturation of both the voltage detection circuit 110 and the current detection circuit 112. The chances of saturation of the current detection circuit 112 during the high field scenarios may be relatively high due to the usage of the fixed low level of attenuation, such that during high field scenarios the current signal corresponding to the field input signal 108 may be allowed to rise beyond the saturation level 130 and may not be sufficiently attenuated. The saturation of both the voltage detection circuit 110 and the current detection circuit 112 create regions, such as, for example, dead zone 136, where both the voltage detection circuit 110 and the current detection circuit 112 remain dysfunctional.

FIG. 1D depicts occurrence of dead zones during intermediate field scenarios in accordance with an exemplary scenario. More particularly, FIG. 1D depicts exemplary operational plots of voltage signal variation and current signal variation with respect to a variation of a field input signal in a field-based communication in accordance with an exemplary scenario. For example, FIG. 1D illustrates a pair of exemplary operational plots, including the first plot 120 corresponding to the voltage detection circuit 110 and a third plot 138 representing a variation of a measure of the field input signal 108 (e.g., in Tesla) along x-axis 124 with a measure of the voltage signals (e.g., in volts) along y-axis 126 corresponding to the current detection circuit 112. The current detection circuit 112 is configured to attenuate the current signals using a fixed high level of attenuation. It is noted that a reference to the current signal herein may be construed as a voltage equivalent of the current signal.

With reference still to FIG. 1D, the third plot 138 representing a variation of the current signal with the field input signal 108 increases slowly from an initial value of the field input signal 108 until the corresponding voltage equivalent of the current signal reaches a sensitivity level 140 of voltage equivalent of current. Below the sensitivity level 140, the third plot 138 rises slowly between the field input signal values 132 and 134 owing to the high level of attenuation. The voltage levels less than the sensitivity level 140 may not be sufficient to cause the current detection circuit 112 to be functional. Upon attaining a value corresponding to the sensitivity level 140, the third plot 138 begins to rise at a faster rate until the saturation level 130 corresponding to the current detection circuit 112 is attained. It is noted that, in so much as the third plot 138 fails to rise at a considerable rate between field input signal values 132 and 134, the current detection circuit 112 fails to be functional between the field input signal values 132 and 134 that correspond to intermediate field scenarios. Also, it may be observed from FIG. 1D that the first plot 120 also reaches saturation 128, thereby indicating that the voltage detection circuit 110 also fails to remain functional at the field input signal values 132 and 134 that correspond to intermediate field scenarios. As both the voltage detection circuit 110 and the current detection circuit 112 fail to remain functional, a number of 'dead zones', such as, for example, dead zone 142, are created due to the high level of attenuation at the intermediate field scenarios. The 'dead zones' may lead to a loss of data as well as to an introduction of an error in the reception of the field input signal 108 in the field-based communication. For example, if an NFC reader is moved towards an NFC tag while transmitting the field input signals 108 to the NFC tag, at some locations (for example, at 136) during the motion, the NFC tag may fail to receive the field input signals 108 transmitted from the NFC reader, thereby causing erroneous communication.

Various embodiments of the present technology, however, provide circuits and methods for field-based communication that are capable of overcoming these and other obstacles and providing additional benefits. Various embodiments of the present technology provide circuits and methods for mitigating the disadvantages of noise signals, fixed amplification, and fixed gain based on, for example, (1) selection of one of the voltage detection circuit and the current detection circuit based on the nature of the field input signal, (2) dynamic control of attenuation values, and (3) dynamic control of gain parameters in a demodulation circuit. An exemplary circuit provided in accordance with an embodiment is explained herein with reference to FIG. 2.

The following description and accompanying figures demonstrate that the present technology may be practiced or otherwise implemented in a variety of different embodiments. It should be noted, however, that the scope of the present technology is not limited to any or all of the embodiments disclosed herein. Indeed, one or more of the devices, features, operations, processes, characteristics, or other qualities of a disclosed embodiment may be removed, replaced, supplemented, or changed.

Figure 2:
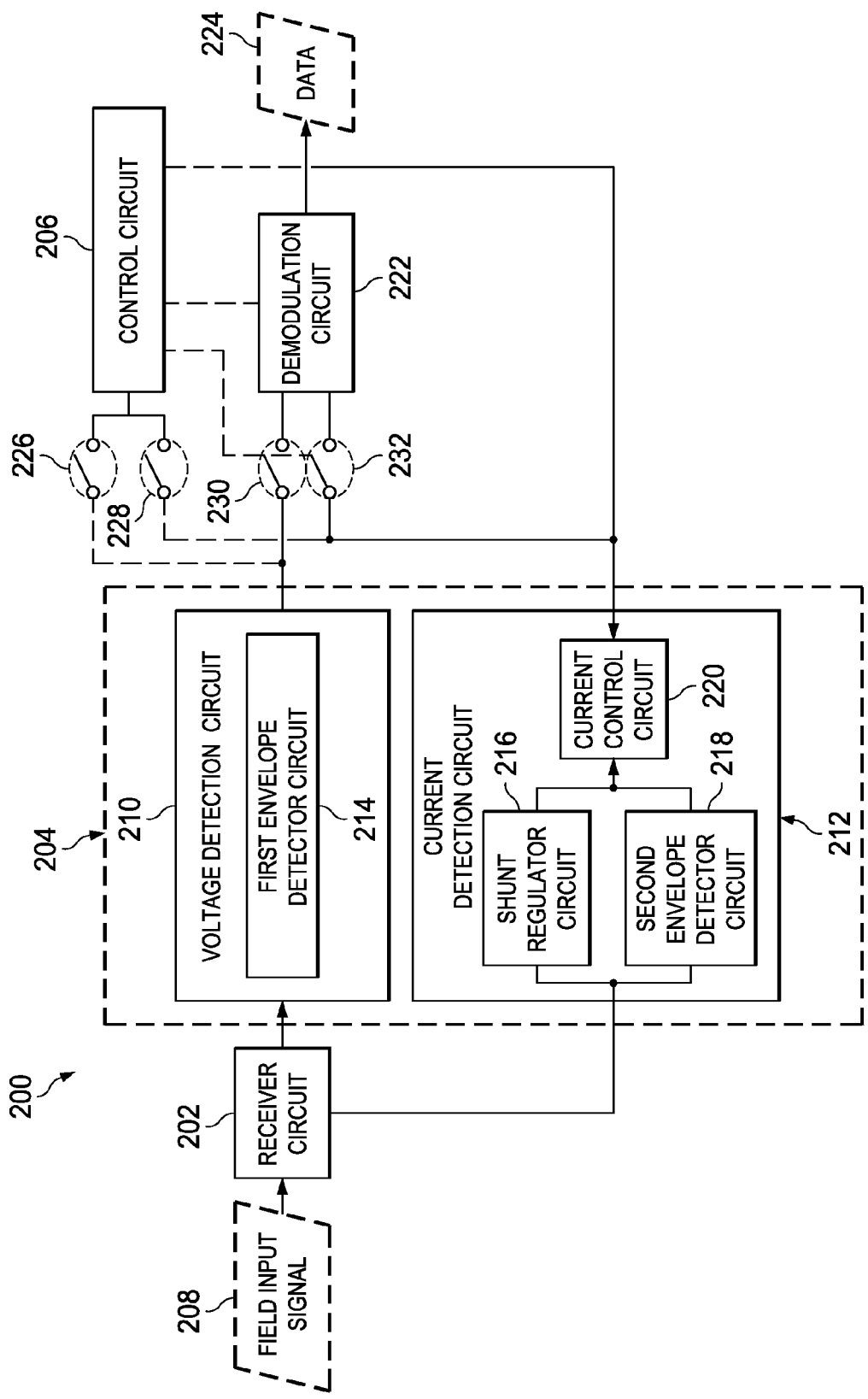
FIG. 2 illustrates an exemplary circuit configured for field-based communication in accordance with an embodiment.

FIG. 2 illustrates a circuit 200 configured for field-based communication in accordance with an embodiment. In an embodiment, the circuit 200 is configured to be included within a field-based communication receiver, such as, for example, for example, an NFC-enabled user device. Examples of the NFC-enabled user device may include, for example, a personal computer (PC), a tablet PC, a personal digital assistant (PDA), a mobile communication device, a web appliance, a set-top box (STB), an embedded system and/or any machine capable of executing a set of instructions (sequential and/or otherwise) so as to enable reception and transmission of field-based communication signals. In one embodiment, however, the circuit 200 may be communicatively associated or coupled with, or connected or coupled to, a field-based communication receiver. In an embodiment, the circuit 200 includes a receiver circuit 202, a detection circuit 204 and a control circuit 206. The receiver circuit 202 may be substantially similar to the receiver circuit 102 of FIG. 1A and is configured to receive a field input signal 208 from a field source. In an embodiment, the receiver circuit 202 may include a transducer, or an antenna, or a combination of an antenna and an impedance matching circuit. The impedance matching circuit may be configured to remove a mismatch loss in the antenna by matching impedance associated with the antenna to that of a communication path between the field source and the antenna. The mismatch loss may include, or be associated with, for example, power reflected from a load associated with the antenna. In an embodiment, the impedance matching circuit may include one or more capacitors coupled in parallel to the antenna and one or more inductors serially coupled with the communication path. Examples of the field input signal 208 may include, for example, a signal associated with a radio frequency field, a magnetic field, and the like.

The detection circuit 204 is communicatively associated or coupled with the receiver circuit 202. In an embodiment, the detection circuit 204 includes a voltage detection circuit 210 and a current detection circuit 212. In some example embodiments, the voltage detection circuit 210 and the current detection circuit 212 may constitute separate circuit entities and need not be within the detection circuit 204. In an embodiment, the voltage detection circuit 210 is coupled in parallel with the current detection circuit 212. In an embodiment, the voltage detection circuit 210 is configured to detect a voltage signal associated with the field input signal 208. In an embodiment, the voltage detection circuit 210 may include a first envelope detector circuit 214 configured to detect peak signal magnitudes of the voltage signal. In an embodiment, the voltage detection circuit 210 may include a diode-based detection circuit or a coherent-sampling-based detection circuit. In an embodiment, the current detection circuit 212 is configured to detect a current signal associated with the field input signal 208. In an embodiment, the current detection circuit 212 includes a shunt regulator circuit 216, a second envelope detector circuit 218 and a current control circuit 220. The second envelope detector circuit 218 is configured to operate in concert with the shunt regulator circuit 216 to detect peak signal magnitudes associated with the current signal. In various embodiments, the current control circuit 220 is configured to attenuate the detected current signal to prevent saturation of the current detection circuit 212.

In an embodiment, the circuit 200 may additionally include a demodulation circuit 222 communicatively associated or coupled with the detection circuit 204. The demodulation circuit 222 may be configured to demodulate the voltage signal and the current signal output from the detection circuit 204 to thereby generate data 224 associated with the field input signal 208.

In an embodiment, the control circuit 206 may be communicatively associated or coupled with the detection circuit 204 and the demodulation circuit 222. In an embodiment, the control circuit 206 may be embodied within a signal strength detector or controller associated with the field-based communication receiver circuit 200. In an embodiment, the control circuit 206 may be embodied within an application specific integrated circuit (ASIC) or a field programmable gate array (FPGA) specifically configured to perform a number of the operations, or a combination thereof, of the control circuit 206, such as in a manner described herein. In an embodiment, the control circuit 206 may also include memory devices (e.g., a cache), timing devices (e.g., a real-time clock (RTC)), an array of configurable logic blocks (CLBs), an array of programmable input/output blocks (IOBs) and/or additional circuitry or data transmission channels. In an embodiment, the CLBs and IOBs may be interconnected or coupled with one another by a programmable interconnect structure. In an embodiment, the control circuit 206 may be programmed by loading a stream of configuration data (e.g., a bit-stream) into internal configuration memory cells associated with the memory devices, wherein this configuration data may include definitions of various configurations. The configuration data may also be read from an external memory (e.g., a programmable read only memory (PROM)) or written into the FPGA by an external device. The collective states of the individual memory cells then determine the function of the FPGA.

In an embodiment, the control circuit 206 is communicatively associated or coupled with the voltage detection circuit 210 and the current detection circuit 212 through a first switch 226 and a second switch 228, respectively, wherein a selection (or closure) of the first switch 226 enables the control circuit 206 to detect a first signal magnitude of the voltage signal, and wherein a selection (or closure) of the second switch 228 enables the control circuit 206 to detect a second signal magnitude of the current signal. In an embodiment, the control circuit 206 may be configured to trigger a selection of one of the voltage detection circuit 210 and the current detection circuit 212 based on the detection of the first and the second signal magnitudes relative to at least a first predetermined threshold level of voltage.

In an embodiment, as depicted in FIG. 2, the demodulation circuit 222 may be communicatively associated or coupled with the voltage detection circuit 210 and the current detection circuit 212 through a third switch 230 and a fourth switch 232, respectively. In an embodiment, the control circuit 206 is configured to control the closing and opening of the third switch 230 and the fourth switch 232 based on the detection of the first signal magnitude and the second signal magnitude. In an embodiment, the control circuit 206 controls the closing and opening of the third switch 230 and the fourth switch 232 so as to trigger a selection of one of the voltage detection circuit 210 and the current detection circuit 212 to be communicatively associated with (e.g., electronically connected or coupled to) the demodulation circuit 222 so as to facilitate a demodulation of the voltage signal or the current signal detected through the voltage detection circuit 210 or the current detection circuit 212, respectively. The triggering of the selection of one of the voltage detection circuit 210 and the current detection circuit 212 ensures that only one of voltage detection circuit 210 and the current detection circuit 212 is functional at a time, and, consequently, an occurrence of idle instances of the current detection circuit 212 is prevented, thereby preventing a noise signal injection into the voltage detection circuit 210. It is noted that such a noise signal injection into the voltage detection circuit 210 was previously described herein with reference to FIG. 1A.

In an embodiment, each of the first switch 226, the second switch 228, the third switch 230, and the fourth switch 232 are configured to assume (or default to) an "open" state. Upon receiving the field input signal 208 at the receiver circuit 202, the control circuit 206 causes one of the first switch 226 and the second switch 228 to assume (or switch to) a "closed" state. For example, the control circuit 206 may cause the first switch 226 to assume the closed state and the second switch 228 to retain the open state, and the voltage detection circuit 210 is thereby rendered functional. In the present embodiment, the voltage detection circuit 210 is configured to detect the voltage signal associated with the field input signal 208. In one embodiment, when the control circuit 206 causes the second switch 228 to assume the closed state, and the first switch 226 is retained in the open state, the current detection circuit 212 is thereby rendered functional. In this embodiment, the current detection circuit 212 is configured to detect the current signal associated with the field input signal 208.

In an embodiment, one of the voltage detection circuit 210 or the current detection circuit 212 may be rendered functional upon, subsequent to, or based on a determination of the signal magnitude corresponding to one of the voltage signal and the current signal, respectively. In an embodiment, the control circuit 206 is configured to estimate the first signal magnitude corresponding to the voltage signal and the second signal magnitude corresponding to the current signal associated with the field input signal 208. In an embodiment, the control circuit 206 is configured to compare the first signal magnitude of the voltage signal and the second signal magnitude corresponding to the current signal relative with at least a first predetermined threshold level to thereby conduct a signal comparison. In an embodiment, the first predetermined threshold level may include, for example, a sensitivity threshold level of the current detection circuit 212. It is noted that the term "sensitivity threshold" may be construed as referring to, for example, a minimum signal magnitude associated with the current signal corresponding to the field input signal 208 that causes the current detection circuit 212 to be functional in order to detect the current signal without the voltage detection circuit 210 being functional. The control circuit 206 is configured to trigger a selection of one of the voltage detection circuit 210 and the current detection circuit 212 based on the signal comparison. The selection facilitates a demodulation of one of the voltage signal and the current signal. Upon the determination of first or the second signal magnitudes (or being greater than the first predetermined threshold level, the control circuit 206 is configured to trigger a selection of the current detection circuit 212 to be communicatively associated with (e.g., electronically connected or coupled to) the demodulator circuit 222 so as to be functional to detect the current signal corresponding to the field input signal 208 and transmit the detected current signal to the demodulator circuit 222 for demodulation.

In an exemplary embodiment, the current detection circuit 212 may be initially rendered functional in order to perform the detection of the current signal corresponding to the field input signal 208 by causing the second switch 228 to assume the closed state. In the present embodiment, the current detection circuit 212 may determine that the second signal magnitude associated with the current signal is greater than the first predetermined threshold level. Based on such a determination, the control circuit 206 may cause the second switch 228 to assume the open state and the fourth switch 232 to assume the closed state, thereby triggering the selection of the current detection circuit 212 to be communicatively associated with (e.g., electronically connected or coupled to) the demodulator circuit 222. Upon, subsequent to, or based on the second signal magnitude of the current signal determined through the current detection circuit 212 being less than or equal to the first predetermined threshold level, the control circuit 206 causes the second switch 228 to assume the open state and the third switch 230 to assume the closed state, thereby triggering the selection of the voltage detection circuit 210 to be communicatively associated with (e.g., electronically connected or coupled to) the demodulator circuit 222, so as to be functional to detect the voltage signal associated with the field input signal 208 and to transmit the detected voltage signal to the demodulator circuit 222 for demodulation. It is noted that the control circuit 206 causes the first switch 226 and the second switch 228 to assume an open state upon or prior to causing the third switch 230 to assume the closed state.

In some embodiments, the voltage detection circuit 210 may be initially rendered functional in order to perform a detection of the voltage signal associated with the field input signal 208 by the control circuit 206. In the present embodiment, in order to render the voltage detection circuit 210 to be functional, the control circuit 206 is configured to cause the first switch 226 to assume the closed state and the second switch 228 to remain in the open state. In this embodiment, the control circuit 206 may determine the first signal magnitude of the voltage signal to be greater than the first predetermined threshold level. Based on such a determination, the control circuit 206 may cause the first switch 226 to assume the open state, and the fourth switch 232 (which is initially open) to assume the closed state, thereby triggering the selection of the current detection circuit 212 in order to perform a detection of the current signal associated with the field input signal 208.

It is noted that, the control circuit 206 causes the first switch 226 and the second switch 228 to assume an open state upon or prior to causing the fourth switch 232 to assume a closed state. In an embodiment, upon, subsequent to, or based on the first signal magnitude of the voltage signal being lesser than or equal to the first predetermined threshold level, the control circuit 206 causes the first switch 226 to open and causes the third switch 230 to close, thereby triggering the selection of the voltage detection circuit 210 to be communicatively associated with (e.g., electronically connected or coupled to) the demodulator circuit 222 so as to be functional to detect the voltage signal corresponding to the field input signal 208 and to transmit the detected voltage signal to the demodulator circuit 222 for demodulation. It is noted that the control circuit 206 causes the first switch 226 and the second switch 228 to assume an open state upon or prior to causing the third switch 230 to assume a closed state.

In an embodiment, an increase in the voltage corresponding to the current signal detected by the current detection circuit 212 beyond a specific level, upon, subsequent to or based on an increase of the field input signal 208, may cause saturation of the current detection circuit 212. As such, the current signal is to be attenuated if the corresponding voltage goes beyond this level. In an embodiment, the signal magnitude of the voltage beyond which the current detection circuit 212 attains saturation is referred to as a second predetermined threshold level. In an exemplary embodiment, the current signal is prevented from attaining saturation by attenuating the current signal when the second signal magnitude corresponding to the current signal is determined to be greater than the second predetermined threshold level. In an embodiment, the current control circuit 220 is configured to control a second signal magnitude of the current signal relative to at least the second predetermined threshold level by attenuating the current signal. In an embodiment, the second predetermined threshold level may correspond to a saturation of the current detection circuit 212. In an embodiment, the current control circuit 220 attenuates the current signal upon, subsequent to, or based on a determination of the second signal magnitude of the current signal (or the voltage equivalent of the current signal) exceeding the second predetermined threshold level.

In an embodiment, the control circuit 206 is configured to vary the attenuation of the current signal based on a first reference database so as to maintain the second signal magnitude associated with the current signal between the first predetermined threshold level and the second predetermined threshold level. In an embodiment, the first reference database includes a plurality of attenuation values corresponding to a plurality of values of the second signal magnitude of the current signal. In an embodiment, the control circuit 206 is configured to sweep through the plurality of. attenuation values to determine an attenuation value corresponding to the second signal magnitude of the current signal from among the plurality of attenuation values. In an embodiment, the variation of the level of attenuation applied to the current signal based on the first reference database prevents the creation of dead zones, because at least one of the current detection circuit 212 and the voltage detection circuit 210 remain operative even during the intermediate intensities of the field input signal 208, thereby mitigating the issues associated with the fixed attenuation explained herein with reference to FIGS. 1C and 1D.

It is noted that, in so much as the first predetermined threshold level is indicative of a sensitivity of the current detection circuit 212 while the second predetermined threshold level is indicative of a saturation level of the current detection circuit 212, the value of first predetermined threshold level is lower than the second predetermined threshold level. The first predetermined threshold level and the second predetermined threshold level are further described herein with reference to FIG. 3.

In an embodiment, the control circuit 206 is configured to perform a comparison of the second signal magnitude of the current signal, subsequent to the attenuation, with a plurality of pre-determined reference values. In an embodiment, the control circuit 206 may include a comparator circuit configured to perform the comparison. In an embodiment, the comparator circuit 206 may perform the comparison based on a successive approximation register (SAR) analog-to-digital converter (ADC) based algorithm. The SAR ADC is a type of analog-to-digital converter that converts a continuous analog waveform into a discrete digital representation via a binary search through all possible quantization levels before finally converging upon a digital output for each conversion. An SAR ADC circuit may include a sample and hold circuit configured to acquire an input voltage (Vin), as well as an analog voltage comparator that compares Vin to an output of an internal digital-to-analog converter (DAC) and outputs the result of the comparison to a successive approximation register (SAR), wherein the SAR is designed to supply an approximate digital code of Vin to an internal DAC, and wherein the internal reference DAC supplies the comparator with an analog voltage equivalent of the digital code output of the SAR for comparison with Vin. The SAR is initialized so that a most significant bit (MSB) is equal to a digital 1. The code of the SAR is fed into the DAC, which then supplies the analog equivalent of the digital code into the comparator circuit for comparison with the sampled input voltage. If the analog voltage exceeds Vin, the comparator causes the SAR to reset the bit; otherwise, the bit is left at 1. Then, the next bit is set to 1, and the same test is done, thereby continuing the binary search until every bit in the SAR has been tested. The resulting code is the digital approximation of the sampled input voltage and is finally output by the DAC at the end of the conversion.

In an embodiment, the comparator circuit compares the second signal magnitude of the current signal with a first reference value (for example, 0) from among the plurality of pre-determined reference values. An output of the comparator circuit output may be high (logic 1) if the second signal magnitude of the current signal does not match the first reference value. Upon, subsequent to, or based on a determination of the comparator output being high, the second signal magnitude of the current signal is compared with a second reference value (for example, 0.1) from among the plurality of predetermined reference values. If the output of the comparator circuit remains high, the reference value is again changed to a subsequent reference value from among the plurality of predetermined reference values. The comparator circuit compares the second signal magnitude of the current signal with one or more of the plurality of pre-determined reference values until the output of the comparator circuit becomes low (logic 0), which is indicative of the second signal magnitude of the current signal matching with a reference value from among the plurality of pre-determined reference values, and the reference value is selected as the second signal magnitude of the current signal that is suitable for demodulation. In an embodiment, the comparator circuit determines the second signal magnitude of the current signal suitable for demodulation based on the comparison. The second signal magnitude of the current signal determined through the comparison may correspond to an exact value of the current signal (or voltage equivalent of the current signal) detected by the current detection circuit 212.

In an embodiment, upon triggering the selection of the voltage detection circuit 210, the control circuit 206 may be configured to perform a comparison of the voltage signal with the plurality of pre-determined reference values. In an embodiment, the comparison may be performed by the comparator circuit. In an embodiment, the comparator circuit may perform the comparison based on the SAR ADC algorithm, such as explained earlier herein. In an embodiment, the comparator circuit compares the first signal magnitude of the voltage signal with a first reference value (for example, 0) from among the plurality of pre-determined reference values. An output of the comparator circuit may be high (logic 1) if the first signal magnitude of the voltage signal does not match with initial reference value. Upon, subsequent to, or based on the output of the comparator circuit being high, the first signal magnitude of the voltage signal is compared with a second reference value (for example, 0.1) from among the plurality of predetermined reference values. If the output of the comparator circuit remains high, the reference value is again changed to a subsequent reference value from among the plurality of predetermined reference values. The comparator circuit compares the first signal magnitude of the voltage signal with one or more of the plurality of pre-determined reference values until the output of the comparator circuit becomes low (logic 0), which is indicative of the first signal magnitude of the voltage signal matching a reference value from among the plurality of pre-determined reference values, and the reference value is consequently selected as the first signal magnitude of the voltage signal that is suitable for demodulation. The first signal magnitude of the voltage signal selected through the comparison may correspond to an exact value of the voltage signal that is determined by the voltage detection circuit 210.

As explained earlier herein, based on a triggering of the selection of one of the voltage detection circuit 210 and the current detection circuit 212, one of the third switch 230 and the fourth switch 232, respectively, may assume a closed state. The closing of the third switch 230 causes the voltage detection circuit 210 to be functional and to be communicatively associated or coupled with the demodulation circuit 222. The closing of the fourth switch 232 causes the current detection circuit 212 to be functional and to be communicatively associated or coupled with the demodulation circuit 222. Upon communicatively associating or coupling one of the voltage detection circuit 210 and the current detection circuit 212 with the demodulation circuit 222, the demodulation circuit 222 may be configured to demodulate the first signal magnitude corresponding to the voltage signal and the second signal magnitude corresponding to the current signal, respectively, which is determined based on the comparison.

In an embodiment, upon closing the fourth switch 232, the demodulation circuit 222 is configured to amplify the second signal magnitude of the current signal based on a second reference database. The second reference database may include a plurality of values for gain parameters corresponding to a plurality of values of the signal magnitudes corresponding to the current or the voltage signals. An example of the second reference database may include a look-up table. The control circuit 206 is configured to select a value of the gain parameter from among the plurality of values of the gain parameters from the second reference database, corresponding to the second signal magnitude of the current signal. The demodulation circuit 222 is configured to amplify the second signal magnitude of the current signal based on the selected value of the gain parameter. In the present embodiment, the control circuit 206 may provide an automatic gain control (AGC) mechanism for controlling the value of the gain parameter based on the second signal magnitude of the current signal. The selection of the gain parameter corresponding to the signal magnitude of the current signal has the advantage that the lower signal magnitude of the current signal may be amplified using a higher value of gain parameter and a higher signal magnitude of the current signal may be amplified using a lower value of gain parameter, thereby avoiding unnecessary amplification of the higher signal magnitude of the current signal. Also, a noise amplification will be reduced as the gain parameter is selected based on the signal magnitude of the current signal since the current signal associated with the noise signals may be of low amplitude and thus may be amplified with a low value of gain parameter. In an embodiment, the demodulation circuit 222 is further configured to demodulate the amplified current signal.

In an embodiment, upon closing the third switch 230, the demodulation circuit 222 is configured to amplify the first signal magnitude of the voltage signal based on the second reference database. The control circuit 206 is configured to select a value of the gain parameter from among the plurality of values of the gain parameters in the second reference database, corresponding to the first signal magnitude of the voltage signal for amplification of the voltage signal.

In the present embodiment, the control circuit 206 may provide the AGC mechanism for controlling the value of the gain parameter based on the first signal magnitude of the voltage signal. The selection of the gain parameter corresponding to the signal magnitude of the voltage signal has the advantage that the lower signal magnitude of the voltage signal may be amplified using a higher value of gain parameter and a higher signal magnitude of the voltage signal may be amplified using a lower value of gain parameter, thereby avoiding unnecessary amplification of the higher signal magnitude of the voltage signal. Also, a noise amplification may be avoided as the gain parameter is selected based on the signal magnitude of the voltage signal. The demodulation circuit 222 amplifies the voltage signal based on the selected value of the gain parameter. The demodulation circuit 222 demodulates the amplified voltage signal. In an embodiment, the demodulation circuit 222 may include a bit slicer circuit configured to convert the demodulated voltage signal or the demodulated current signal into a digital equivalent of the data 224.

Figure 3:
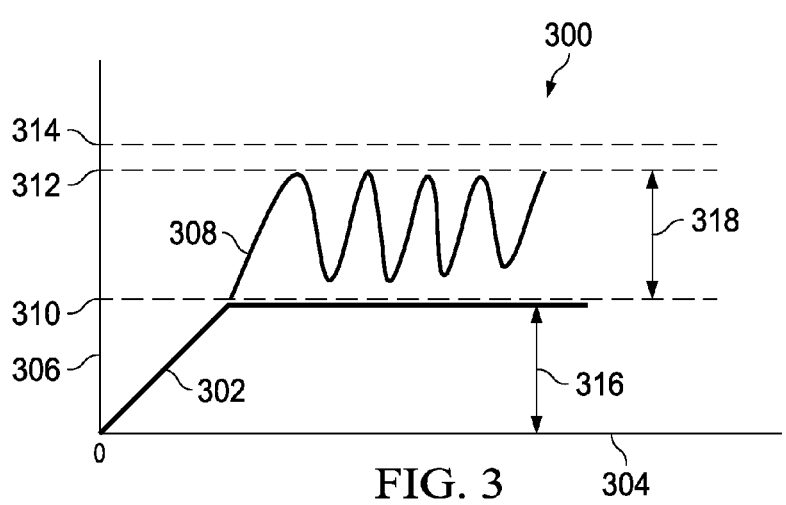
FIG. 3 depicts exemplary operational plots of a variation of voltage signal and current signal with respect to a variation of a field input signal in a field-based communication in accordance with an exemplary embodiment.

FIG. 3 depicts exemplary operational plots 300 for variation of voltage signal and current signal with respect to a variation of a field input signal in a field-based communication, in accordance with an exemplary embodiment. For example, FIG. 3 illustrates a pair of exemplary operational plots, including a first plot 302 representing a variation of a measure of the field input signal (e.g., in Tesla) along x-axis 304 with a measure of the voltage signals (e.g., in volts) along y-axis 306, and a second plot 308 representing a variation of the field input signal along x-axis 304 with the voltage signals along y-axis 306. It will be understood that a reference to the current signal herein may be construed as a voltage equivalent of the current signal. As discussed with reference to FIG. 2, the voltage signal is generated by a voltage detection circuit, for example, the voltage detection circuit 210 while the current signal is generated by the current detection circuit, for example, the current detection circuit 212. Accordingly, it will be understood that the first plot 302 corresponds to the voltage detection circuit 210 of FIG. 2 and the second plot 308 corresponds to the current detection circuit 212 of FIG. 2.

As discussed with reference to FIG. 2, during the field-based communication, the field-based communication circuit, for example the circuit 200 is configured to determine the field input signal based on the determination of one of the voltage signal or the current signal. The voltage signal or the current signal is determined upon actuation of one of the voltage detection circuit or the current detection circuit respectively. In an embodiment, the current detection circuit is configurable to operate when a second signal magnitude of the current signal varies between the first predetermined threshold level and the second predetermined threshold level. Additionally, the voltage detection circuit is not configured to operate/function beyond the first predetermined threshold level of the voltage signal associated with the field input signal. Referring now to FIG. 3, a first predetermined threshold level 310, a second predetermined threshold level 312 and a third predetermined threshold level 314 are depicted.

As discussed, the first predetermined threshold level 310 corresponds to a sensitivity threshold of the current detection circuit, for example current detection circuit 212 of FIG. 2. The current detection circuit is configured to detect the current signal associated with the field input signal only when the second signal magnitude of the current signal is greater than the first predetermined threshold level 310. In an embodiment, the current detection circuit may detect the current signal associated with the field input signal until the second signal magnitude of the current signal is lower than the saturation level of the current detection circuit. In an embodiment, saturation level of the current detection circuit may be represented by the second predetermined threshold level 312. In an embodiment, a saturation level of the voltage detection circuit, for example voltage detection circuit 210 of FIG. 2, may be represented by the third predetermined threshold level 314, such that the voltage detection circuit may be caused to be dysfunctional for detection of the field input signal for the signal magnitudes greater than the third predetermined threshold level 314. However, in accordance with an embodiment of the present technology, the voltage detection circuit is caused to be functional for detection of the field input signal for the signal magnitudes lesser than the first predetermined threshold level 310.

As illustrated in FIG. 3, the first plot 302 begins to rise from an initial value (for example, 0) of the field input signal and increases gradually until the corresponding voltage signal reaches the first predetermined threshold level 310, indicative of operation of the voltage detection circuit in a first region 316 below the first predetermined threshold level 310. When the voltage signal associated with the field input signal exceeds the first predetermined threshold level 310, the voltage detection circuit may become dysfunctional and the current detection circuit may be solely functional to determine the current signal associated with the field input signal.

The second plot 308 is indicative of the operation of the current detection circuit. As illustrated, the second plot 308 begins to rise from the first predetermined threshold level 310 and continues to rise up to the second predetermined threshold level 312 indicative of the operation of the current detection circuit in a second region 318 between the first predetermined threshold level 310 and the second predetermined threshold level 312. Until a second signal magnitude corresponding to the current signal attains a signal magnitude equivalent to the second predetermined threshold level 312, the control circuit 206 causes the corresponding current signal to be attenuated using an attenuation value based on the second signal magnitude of the current signal, so as to cause the current signal to dip below the second predetermined threshold level 312. For example, as illustrated in FIG. 3, the second plot 308 varies between the first threshold level 310 and the second threshold level 312. The control circuit 206 of FIG. 2 ensures the operation of the voltage detection circuit 210 in the first region 316 and that of the current detection circuit 212 in the second region 318 to achieve optimal performance of the circuit 200.

As already discussed, in various embodiments, the signal magnitudes corresponding to the voltage signal and the current signal suitable for performing demodulation may be determined based on a comparison of the detected signal magnitude of the current signal and the voltage signal with a plurality of predetermined values. Various exemplary plots illustrating variation of the current signal and the voltage signal during such detection being performed by the field communication circuit, for example, the circuit 200 are illustrated and described with reference to FIGS. 4A-4D.

Figure 4A:
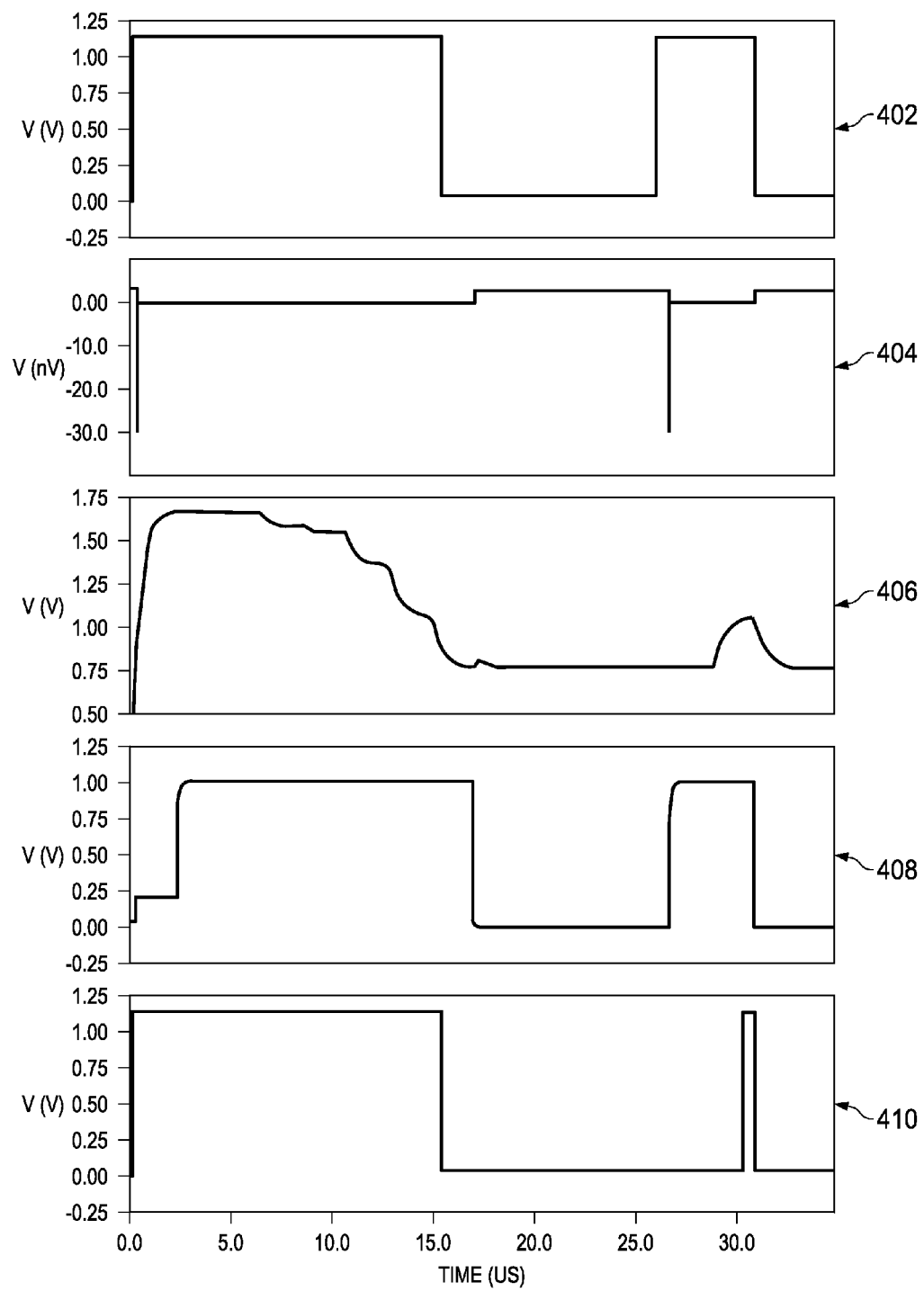
FIGS. 4A-4D illustrate exemplary signal variations for the circuit of FIG. 2 in accordance with an embodiment.
Figure 4B:
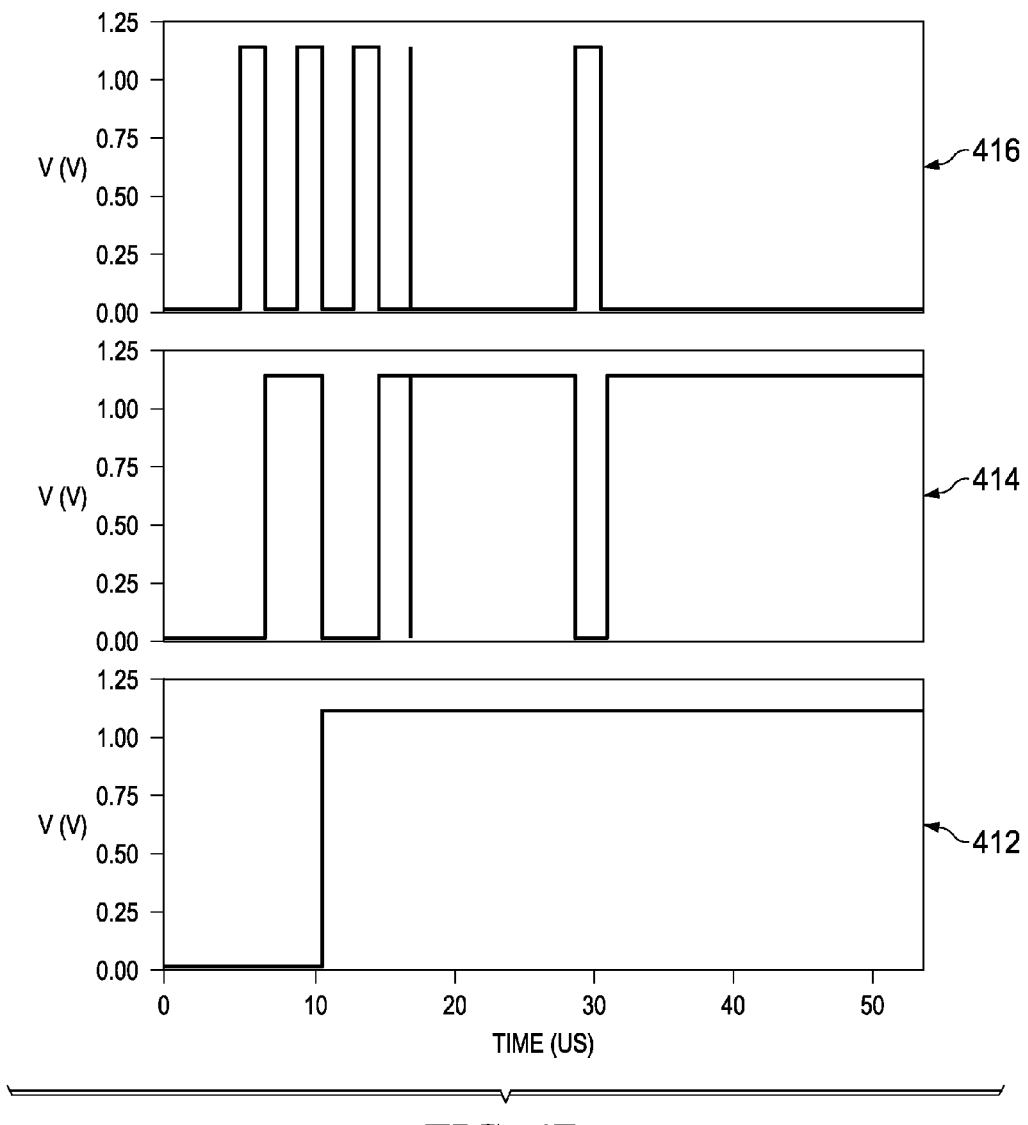

FIGS. 4A-4D illustrate exemplary signal variations for the circuit 200 of FIG. 2, in accordance with an embodiment. More specifically, FIGS. 4A-4B depict simulation results of operation of a current detection circuit, for example the current detection circuit 212 of FIG. 2. FIG. 4A illustrates a calibration enable signal 402 for the current detection circuit 212 that controls enabling of the first switch 226, a calibration enable signal 404 for the voltage detection circuit 210 which controls enabling of the second switch 228, a signal input 406 corresponding to the voltage equivalent of the current signal detected through the current detection circuit 212, and a signal input 406 provided to a positive terminal of a comparator circuit of the control circuit 206, a reference signal 408 provided to a negative terminal of the comparator circuit, and an output signal 410 of the comparator circuit.

As illustrated in FIG. 4A, initially (at time instant, t=0.5 micro seconds) upon providing the field input signal, the reference signal 408 is set corresponding to a first predetermined threshold level. In an exemplary embodiment, the first predetermined threshold level is set to 210 mV. The output signal 410 of the comparator is determined to be at logic 1, indicative of the voltage equivalent of the current signal being greater than 210 mV. The calibration enable signal 402 is turned on to connect the current detection circuit 212 to the control circuit 206. On the voltage equivalent of the current signal being greater than 210 mV the calibration signal 404 is kept OFF indicating that the current detection circuit 212 will be used for further processing. At a subsequent instance (e.g. at time instant, t=5 us), the reference signal 408 is set to 1V corresponding to the second predetermined threshold level to determine the signal magnitude corresponding to the current signal relative to the second predetermined threshold level. The output signal 410 of the comparator circuit remains high at logic 1 and so the attenuation is increased till the output signal 410 goes low to logic 0. As a consequence, the detected voltage equivalent of the current signal represented by the signal input 406 transitions from 1.694 to 1.682 followed by transitions to values 1.606, 1.563, 1.385, 1.084, and 764 mV as indicated in FIG. 4A. The corresponding attenuation code obtained is depicted in FIG. 4B.

Referring to FIG. 4B, the attenuation code includes a most significant bit (MSB) 412 of the attenuation code and the subsequent bits 414 and 416. As may be observed from FIG. 4B, the MSB 412 is low at logic 0 and the subsequent bits 414 and 416 are high at logic 1 representing the attenuation code of 011 for the simulation result depicted in FIG. 4A.

Figure 4C:
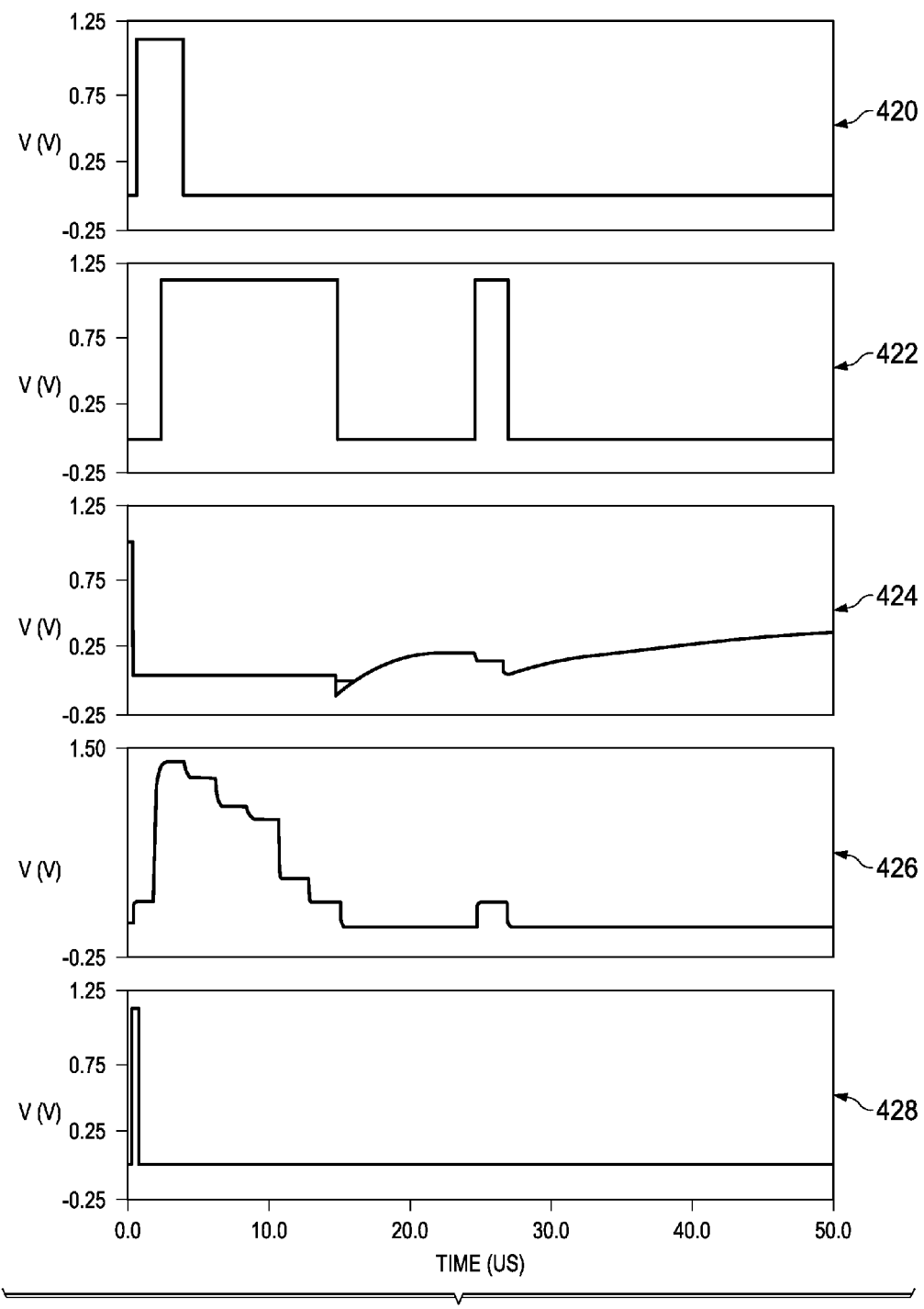
Figure 4D:
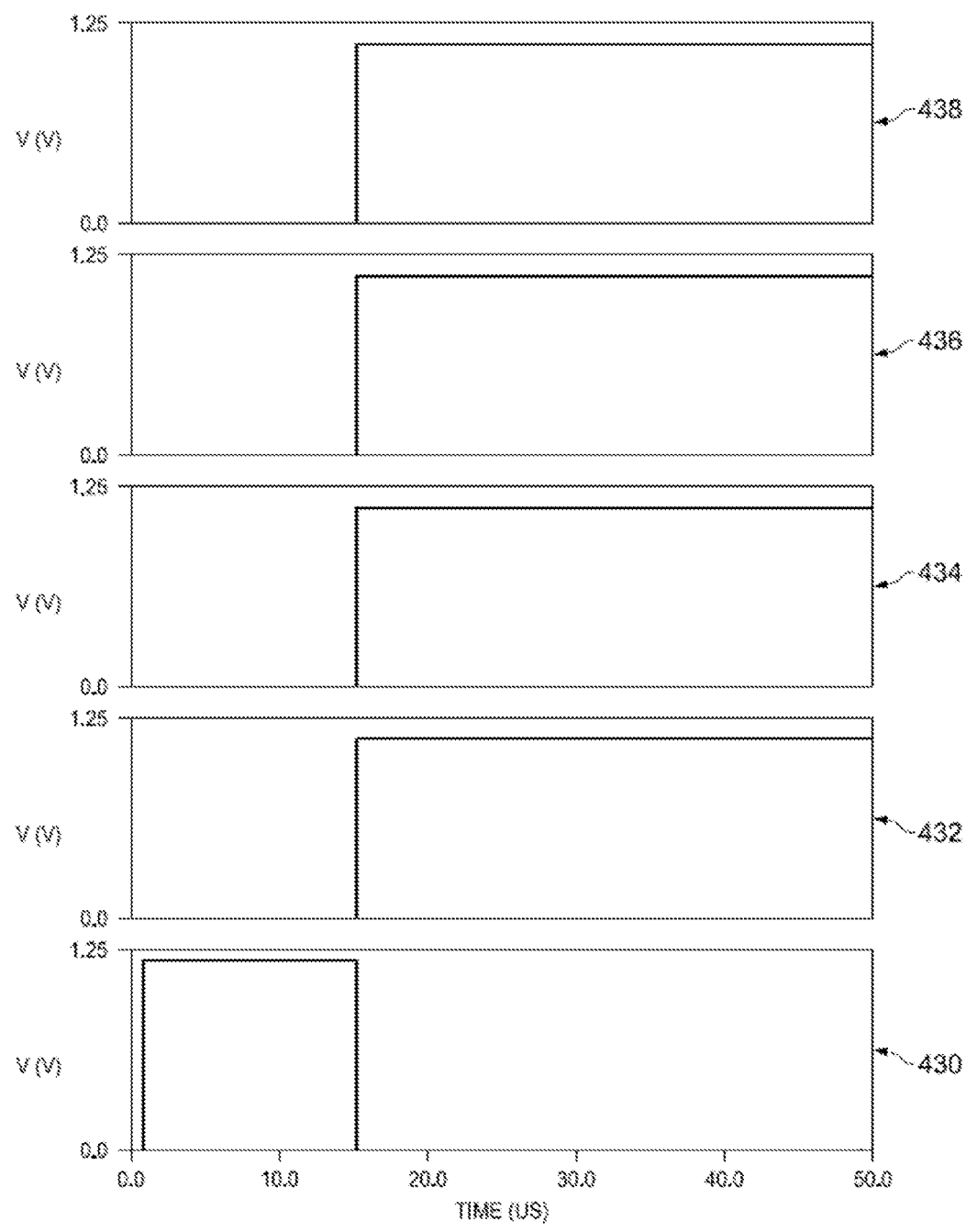

Referring now to FIGS. 4C-4D simulation results of operation of a voltage detection circuit, for example, the voltage detection circuit 210 of FIG. 2 are illustrated. More specifically FIG. 4C illustrates a calibration enable signal 420 that controls enabling of the second switch 228, a calibration enable signal 422 that controls enabling of the first switch 226, a signal input 424 corresponding to the voltage signal detected through the voltage detection circuit 210 provided to the positive terminal of the comparator circuit of the control circuit 206, a reference signal 426 provided to the negative terminal of the comparator circuit, and an output signal 428 of the comparator circuit. As illustrated in FIG. 4C, initially (e.g. at time instant, t=0) upon providing the field input signal, the reference signal 426 is set corresponding to the first predetermined threshold level. In an exemplary embodiment, the value of the first predetermined threshold level may be 210 mV. The calibration signal 402 is turned on to connect the current detection circuit 212 to the control circuit 206. The output signal 428 of the comparator is determined to be at logic 0, indicative of the voltage signal being less than 210 mV. Upon the voltage signal being less than 210 mV that is the first predetermined threshold level, the voltage detection circuit may be operated to determine the voltage signal corresponding to the field input signal as the voltage of less than 210 mV may not be sufficient to cause the current detection circuit 212 to be functional to detect the corresponding current signal.

Accordingly, the calibration signal 422 for the voltage detection circuit is turned ON and the calibration signal 420 for the current detection circuit is turned OFF. At a subsequent instance (for example, at time instance t=5 us), the reference signal 426 is set to 1.39 V corresponding to the saturation voltage of the voltage detection circuit 210. The output signal 428 of the comparator circuit remains low at logic 0 and so the reference signal 426 is reduced from a value represented as M1 (corresponding to 1.39V) till a value represented as M7 (corresponding to 210 mV) in the steps, as depicted in FIG. 4C. At a value represented as M7 (corresponding to 211.6 mV), the output signal 428 remains low at logic 0. The gain code corresponding to 210 mv is selected as depicted in FIG. 4D. FIG. 4D depicts a MSB 430 of the gain code and the subsequent bits 432, 434, 436 and 438. The MSB 430 is low at logic 0 and the subsequent bits 432, 434, 436, and 438 are all high at logic 1 representing the gain code of 01111 for the simulation result depicted in FIG. 4C.

The flowchart diagrams that follow are generally set forth as logical flowchart diagrams. The depicted operations and sequences thereof are indicative of at least one embodiment of the present disclosure. It should be appreciated, however, that the scope of the present disclosure includes methods that use other operations and sequences, and methods that are useful or similar in function, logic, or effect. Also, while various arrow types, line types, and formatting styles may be employed in the flowchart diagrams, they are understood not to limit the scope of the corresponding method(s). In addition, some arrows, connectors and other formatting features may be used to indicate the logical flow of the methods. For instance, some arrows or connectors may indicate a waiting or monitoring period of an unspecified duration. Accordingly, the specifically disclosed operations, sequences, and formats are provided to explain the logical flow of the methods and are understood not to limit the scope of the present disclosure.

Figure 5A:
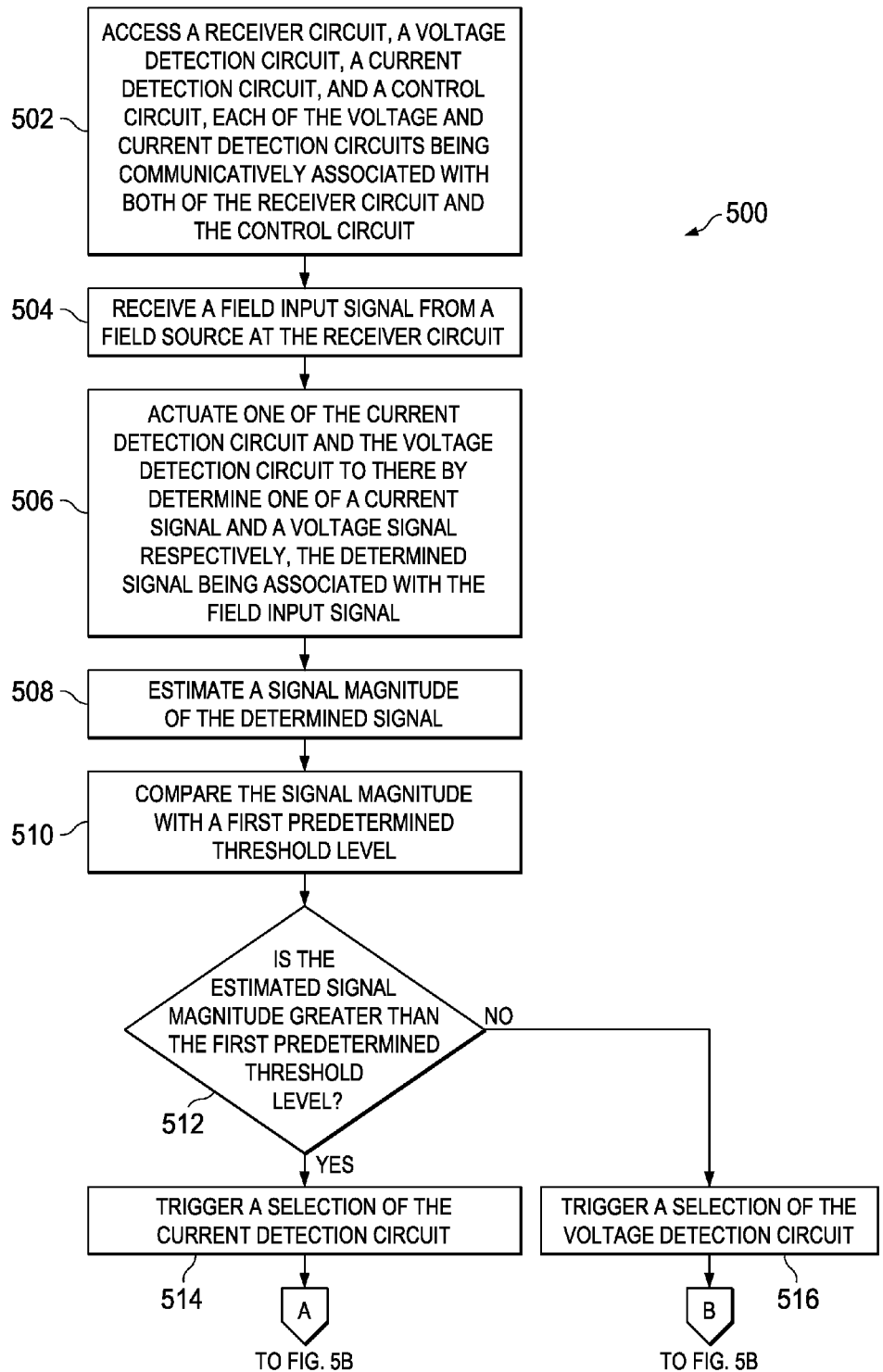
FIGS. 5A-5B collectively depict a flow diagram of an exemplary method for field-based communication in accordance with an embodiment.
Figure 5B:
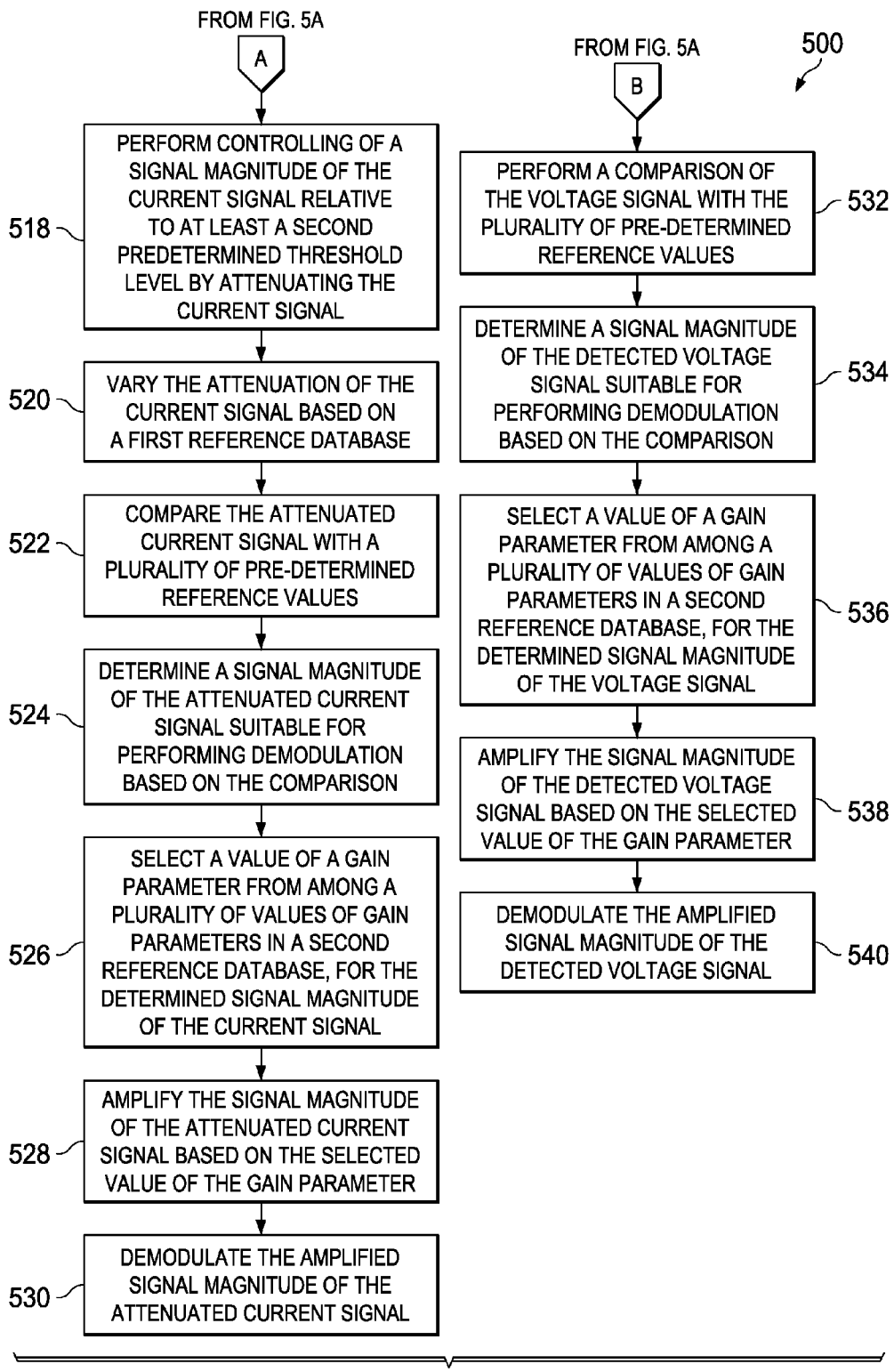

FIGS. 5A-5B collectively depicts a flow diagram of a method 500 for field-based communication, in accordance with an embodiment. The method 500 may be performed using the circuit 200 of FIG. 2. In an embodiment the circuit 200 is configured to be included within a field-based communication receiver, such as, for example, an NFC-enabled user device. Examples of the NFC-enabled user device may include, but are not limited to, PC, a tablet PC, PDA, a mobile communication device, a web appliance, a STB, an embedded system and/or any machine capable of executing a set of instructions (sequential and/or otherwise) so as to enabled reception and transmission of field-based communication signals. Alternatively, in an embodiment, the circuit 200 may be communicatively associated or coupled with a field-based communication receiver.

In an embodiment, in operation 502 of the method 500, a receiver circuit, a voltage detection circuit, a current detection circuit, and a control circuit are accessed. Each of the voltage and current detection circuits are communicatively associated with both of the receiver circuit and the control circuit. In an embodiment, in operation 504, a field input signal from a field source is received at the receiver circuit (for example, receiver circuit 202 of FIG. 2). Examples of the field input signal may include, a signal associated with a radio frequency field, a magnetic field, and the like. Examples of the field source may include an NFC reader. In an embodiment, the reception of the field input signal 208 may be represented by generation of voltage signals or current signals in the receiver circuit as a result of induction due to the field input signal.

In an embodiment, in operation 506, one of a current detection circuit (for example, current detection circuit 212 of FIG. 2) and a voltage detection circuit (for example, voltage detection circuit 210 of FIG. 2) communicatively associated or coupled with the receiver circuit may be actuated to thereby determine one of a current signal and a voltage signal, wherein each of the current and voltage signals are associated or coupled with the field input signal. In an embodiment, a control circuit (for example, control circuit 206 of FIG. 2) communicatively associated or coupled with the receiver circuit may actuate one of the current detection circuit and the voltage detection circuit. In an embodiment, the current detection circuit may be actuated, for example, by closing the first switch 226 (refer FIG. 2). In an embodiment, the voltage detection circuit may be actuated, for example by closing the second switch 226 (refer FIG. 2).

In an embodiment, in operation 508, a signal magnitude of one of the determined current signal and the determined voltage signal relative may be estimated by the control circuit. It will be understood that a reference to the current signal herein may be construed as a voltage equivalent of the current signal. In an embodiment, in operation 510, the signal magnitude is compared with a first predetermined threshold level. In an embodiment, the first predetermined threshold level may correspond to a sensitivity threshold of the current detection circuit. It is noted that the term "sensitivity threshold" is construed as referring to a minimum signal magnitude of the voltage signal corresponding to the field input signal that causes the current detection circuit to be functional, and able to detect the current signal without the need for the voltage detection circuit to be functional.

In operation 512, it is determined whether the estimated signal magnitude of the current signal or the voltage signal is greater than the first predetermined threshold level. Upon, subsequent to, or based on a determination of the estimated signal magnitude of the current signal or the voltage signal being greater than the first predetermined threshold level, in operation 514, a selection of the current detection circuit to be communicatively connected or coupled to a demodulation circuit (for example, demodulation circuit 222 of FIG. 2) is triggered. The demodulation circuit may be communicatively associated or coupled with the detection circuit and the control circuit. If however, it is determined at operation 512 that the estimated signal magnitude of the current signal or the voltage signal is less than or equal to the first predetermined threshold level, then in operation 516 a selection of the voltage detection circuit to be communicatively connected or coupled to a demodulation circuit is triggered. In an embodiment, the triggering of the selection of one of the voltage detection circuit or the current detection circuit may be represented by closing of one of the third switch 230 and the fourth switch 232 (refer FIG. 2), respectively.

In an embodiment, on triggering the selection of the current detection circuit, in operation 518, controlling of the estimated signal magnitude of the current signal is performed relative to at least a second predetermined threshold level by attenuating the current signal by a current control circuit, such as, for example, the current control circuit 220 (refer FIG. 2) communicatively associated or coupled with the current detection circuit. In an embodiment, the second predetermined threshold level is indicative of saturation of the current detection circuit. The first predetermined threshold level and the second predetermined threshold level are illustrated and explained in detail with reference to FIGS. 2 and 3. In an embodiment, the controlling of the signal magnitude of the current signal may be performed by the current control circuit. In an embodiment, the control circuit compares the signal magnitude of the current signal with the second predetermined threshold level. Based on the comparison, if it is determined, that the signal magnitude of the current signal exceeds the second predetermined threshold level, the current control circuit attenuates the current signal.

In operation 520, the attenuation of the current signal may be varied based on a first reference database. In an embodiment, the attenuation may be varied by the control circuit so as to maintain the current signal within the second predetermined threshold level. In an embodiment, the first reference database may include a plurality of attenuation values corresponding to a plurality of values of the signal magnitude of the current signal. In an embodiment, the control circuit may sweep an attenuation algorithm associated with the current control circuit by varying the plurality of attenuation values to vary the attenuation.

In operation 522, the attenuated current signal is compared with a plurality of pre-determined reference values. In an embodiment, the signal magnitude of the attenuated current signal is compared with the plurality of pre-determined reference values by the control circuit. In an embodiment, the control circuit may include a comparator circuit for comparing the attenuated current signal with the plurality of predetermined reference values. In an embodiment, the control circuit may perform the comparison based on a SAR ADC based algorithm. In operation 524, a signal magnitude of the attenuated current signal suitable for performing demodulation may be determined based on the comparison. In an embodiment, the signal magnitude of the attenuated current signal suitable for performing demodulation may be determined by the control circuit. In an embodiment, the signal magnitude of the attenuated current signal may correspond to an exact value of the attenuated current signal.

In operation 526, a value of a gain parameter from among a plurality of values of gain parameters is selected for the determined signal magnitude of the current signal. In an embodiment, the plurality of values of the gain parameter for a plurality of voltage signal magnitudes associated with the current signal may be comprised in a second reference database. In an embodiment, the second reference database may be for example a look up table. In an embodiment, the value of the gain parameter is selected by the control circuit. The control circuit may select the gain parameter from among the plurality of values of the gain parameters corresponding to the signal magnitude of the current signal in the second reference database. In an embodiment, in operation 528, the signal magnitude of the attenuated current signal/the attenuated voltage equivalent of the current signal is amplified based on the selected value of the gain parameter. In an embodiment, the signal magnitude of the attenuated current signal is amplified by the demodulation circuit. In an embodiment, in operation 530, the amplified signal magnitude of the attenuated current signal is demodulated. In an embodiment, the attenuated current signal is demodulated by the demodulation circuit.

In an embodiment, upon triggering the selection of the voltage detection circuit in operation 516, operation 532 is performed. In an embodiment, in operation 532, a comparison of the voltage signal with the plurality of pre-determined reference values is performed. In an embodiment, the comparison is performed by the control circuit. In an embodiment, the control circuit may perform the comparison using the SAR ADC based algorithm. In an embodiment, in operation 534, the control circuit determines a signal magnitude of the detected voltage signal suitable for performing demodulation based on the comparison. In an embodiment, the signal magnitude of the detected voltage signal may correspond to an exact value of the voltage signal determined by the voltage detection circuit. In an embodiment, in operation 536, a value of a gain parameter is selected from among the plurality of values of gain parameters for the determined signal magnitude of the voltage signal. In an embodiment, the plurality of values of the gain parameter for a plurality of signal magnitudes of the voltage signal may be comprised in the second reference database. In an embodiment, the selection may be performed by the control circuit. The selection may be performed as explained earlier in operation 526. In an embodiment, in operation 538, the signal magnitude of the detected voltage signal is amplified based on the selected value of the gain parameter. In an embodiment, the amplification is performed by the demodulation circuit. In an embodiment, in operation 540, the amplified signal magnitude of the detected voltage signal is demodulated. In an embodiment the demodulation is performed by the demodulation circuit.

Without in any way limiting the scope, interpretation, or application of the claims appearing below, advantages of one or more of the exemplary embodiments disclosed herein include elimination of noise signal injection from idle mode of the current detection circuit or the voltage detection circuit due to dynamic selection of the voltage detection circuit or the current detection circuit and also based on the nature of the field input signal. Also, the present technology enables controlling the gain parameters for the current signal and the voltage signal during demodulation, thereby minimizing noise amplification and optimizing the performance of the circuit by minimizing effect of fixed gain on the SNR. Also, the present technology enables controlling attenuation of the current signals in the current detection circuit performed to prevent saturation of the current detection circuit. The controlling of the attenuation reduces occurrence of dead zones during the field-based communication and also increases sensitivity of the field-based communication receiver.

Although the present technology has been described with reference to specific exemplary embodiments, it is noted that various modifications and changes may be made to these embodiments without departing from the broad spirit and scope of the present technology. For example, the various systems, modules, etc., described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various modules and methods may be embodied using transistors, logic gates, and electrical circuits (e.g., application specific integrated circuit (ASIC) circuitry and/or in Digital Signal Processor (DSP) circuitry).

Particularly, the circuit 200 of FIG. 2 may be enabled using software and/or using transistors, logic gates, and electrical circuits (e.g., integrated circuit circuitry, such as, for example, ASIC circuitry). Embodiments of the present disclosure include one or more computer programs stored or otherwise embodied on a computer-readable medium, wherein the computer programs are configured to cause a processor to perform one or more operations, for method 500. A computer-readable medium storing, embodying, or encoded with a computer program, or similar language, may be embodied as a tangible data storage device storing one or more software programs that are configured to cause a processor to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, subsystems, and methods described and illustrated in the various embodiments as discrete or separate may be combined or integrated with other systems, modules, techniques, or methods without departing from the scope of the present technology. Other items shown or discussed as directly coupled or connected with one another, or as directly communicating with each other, may be communicatively associated through some interface or device, such that the items may no longer be considered directly coupled or connected with one another, or directly communicating with each other, but may still be indirectly communicatively associated and in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment. Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A field-based communication circuit comprising:
   a receiver circuit configured to receive a field input signal from a field source;
   a detection circuit communicatively associated with the receiver circuit, the detection circuit comprising:
      a voltage detection circuit communicatively associated with the receiver circuit, the voltage detection circuit configured to detect a voltage signal associated with the field input signal;
      a current detection circuit communicatively associated with the receiver circuit, the current detection circuit configured to detect a current signal associated with the field input signal; and
   a control circuit communicatively associated with the voltage detection circuit and the current detection circuit, the control circuit configured to estimate a first signal magnitude and a second signal magnitude corresponding to the voltage signal and the current signal, respectively, compare the first signal magnitude and the second signal magnitude with at least a first predetermined threshold level to thereby conduct a signal comparison, and trigger a selection of one of the voltage detection circuit and the current detection circuit based on the signal comparison such that the selection facilitates a demodulation of one of the voltage signal and the current signal.

2. The circuit of claim 1, wherein the detection circuit further comprises:

a current control circuit communicatively associated with the current detection circuit for controlling the second signal magnitude corresponding to the current signal relative to at least a second predetermined threshold level by attenuating the current signal.

3. The circuit of claim 2, wherein on triggering the selection of the current detection circuit, the control circuit is further configured to:
vary the attenuation of the current signal based on a first reference database, the first reference database comprising a plurality of attenuation values corresponding to a plurality of values of the second signal magnitude of the current signal;
perform comparison of the second signal magnitude of the current signal subsequent to the attenuation, with a plurality of pre-determined reference values; and
determine a second signal magnitude of the current signal suitable for performing demodulation based on the comparison.

4. The circuit of claim 3 further comprising a demodulation circuit communicatively associated with the detection circuit and the control circuit, the demodulation circuit configured to:
amplify the second signal magnitude of the current signal based on a second reference database, the second reference database comprising a plurality of values for gain parameters corresponding to a plurality of values of the second signal magnitude of the current signal; and
demodulate the amplified second signal magnitude of the current signal.

5. The circuit of claim 4, wherein the control circuit is further configured to select a value of the gain parameter from among the plurality of values of the gain parameters in the second reference database, corresponding to the second signal magnitude of the current signal for amplification of the second signal magnitude of the current signal.

6. The circuit of claim 1, wherein on triggering the selection of the voltage detection circuit, the control circuit is further configured to:
perform comparison of the first signal magnitude of the voltage signal with a plurality of pre-determined reference values; and
determine a first signal magnitude of the voltage signal suitable for performing demodulation based on the comparison.

7. The circuit of claim 6, further comprising a demodulation circuit communicatively associated with the detection circuit and the control circuit, the demodulation circuit configured to:
amplify the first signal magnitude of the voltage signal based on a second reference database, the second reference database comprising a plurality of values for gain parameters corresponding to a plurality of first signal magnitudes of the voltage signal; and
demodulate the amplified first signal magnitude of the voltage signal.

8. The circuit of claim 7, wherein the control circuit is further configured to select a value of the gain parameter from among the plurality of values of the gain parameters in the second reference database, corresponding to the first signal magnitude of the voltage signal for amplification of the first signal magnitude of the voltage signal.

9. A method of field-based communication comprising:
accessing a receiver circuit, a voltage detection circuit, a current detection circuit, and a control circuit, each of the voltage detection circuit and the current detection circuit being communicatively associated with both of the receiver circuit and the control circuit;
receiving a field input signal from a field source at the receiver circuit;
performing, at the control circuit:
actuating one of the current and voltage detection circuits to thereby determine one of a current signal and a voltage signal, respectively, the determined signal being associated with the field input signal;
estimating a signal magnitude of the determined signal;
comparing the signal magnitude with a first predetermined threshold level; and
triggering a selection of one of:
the voltage detection circuit based on a determination that the signal magnitude is one of lesser than and equal to the first predetermined threshold level, and
the current detection circuit based on a determination that the signal magnitude is greater than the first predetermined threshold level.

10. The method of claim 9, further comprising, on triggering the selection of the current detection circuit:
performing controlling of the signal magnitude of the current signal relative to at least a second predetermined threshold level by attenuating the current signal at a current control circuit communicatively associated with the current detection circuit.

11. The method of claim 10, further comprising:
varying, at the control circuit, the attenuation of the current signal based on a first reference database, the first reference database comprising a plurality of attenuation values corresponding to a plurality of values of the signal magnitude of the current signal;
comparing at the control circuit, the attenuated current signal with a plurality of predetermined reference values; and
determining at the control circuit, a signal magnitude of the attenuated current signal suitable for performing demodulation based on the comparison.

12. The method of claim 11, further comprising:
selecting, at the control circuit, a value of a gain parameter from among a plurality of values of gain parameters in a second reference database, for the determined signal magnitude of the current signal, the second reference database comprising the plurality of values for gain parameters corresponding to a plurality of signal magnitudes of the current signal;
amplifying, at a demodulation circuit communicatively associated with the detection circuit and the control circuit, the signal magnitude of the attenuated current signal based on the selected value of the gain parameter, and
demodulating, at the demodulation circuit, the amplified signal magnitude of the attenuated current signal.

13. The method of claim 9, further comprising, on triggering the selection of the voltage detection circuit:
performing, at the control circuit, a comparison of the voltage signal with the plurality of pre-determined reference values; and
determining, at the control circuit, a signal magnitude of the detected voltage signal suitable for performing demodulation based on the comparison.

14. The method of claim 13, further comprising:
selecting, at the control circuit, a value of a gain parameter from among a plurality of values of gain parameters in a second reference database, for the determined signal magnitude of the voltage signal, the second reference database comprising the plurality of values for gain parameters corresponding to a plurality of signal magnitudes of the current signal;

amplifying, at a demodulation circuit communicatively associated with the detection circuit and the control circuit, the signal magnitude of the detected voltage signal based on the selected value of the gain parameter; and demodulating the amplified signal magnitude of the detected voltage signal.

15. A field-based communication circuit comprising:

a receiver circuit configured to receive a field input signal from a field source;

a detection circuit communicatively associated with the receiver circuit, the detection circuit comprising:

a voltage detection circuit communicatively associated with the receiver circuit, the voltage detection circuit configured to detect a voltage signal associated with the field input signal; and a current detection circuit communicatively associated with the receiver circuit, the current detection circuit configured to detect a current signal associated with the field input signal, the current detection circuit comprising a current control circuit configured to implement an attenuation of the detected current signal; and a control circuit communicatively associated with the voltage detection circuit and the current detection circuit, the control circuit configured to:

estimate a first signal magnitude and a second signal magnitude corresponding to the voltage signal and the current signal, respectively, compare the first signal magnitude and the second signal magnitude with at least a first predetermined threshold level to thereby conduct a signal comparison, trigger a selection of one of the voltage detection circuit and the current detection circuit based on the signal comparison such that the selection facilitates a demodulation of one of the voltage signal and the current signal, and vary the attenuation of the detected current signal at the current control circuit communicatively associated with the detection circuit and the control circuit, based on a first reference database, and based on a triggering selection of the current detection circuit, the first reference database comprising a plurality of attenuation values corresponding to a plurality of signal magnitude values, respectively, of the current signal.

16. The circuit of claim 15, wherein the current control circuit is configured to control a signal magnitude of the current signal relative to at least a second predetermined threshold level through the attenuation.

17. The circuit of claim 15, wherein the control circuit is further configured to:

perform comparison of the current signal subsequent to the attenuation, with a plurality of pre-determined reference values; and determine a signal magnitude of the current signal suitable for performing demodulation based on the comparison.

18. The circuit of claim 15, further comprising a demodulation circuit communicatively associated with the detection circuit and the control circuit, the demodulation circuit configured to:

amplify the signal magnitude of the current signal based on a second reference database, the second reference database comprising a plurality of values for gain parameters corresponding to a plurality of values of the signal magnitude of the current signal; and demodulate the amplified signal magnitude of the current signal.

19. The circuit of claim 15, wherein on triggering the selection of the voltage detection circuit, the control circuit is further configured to:

perform comparison of the voltage signal with the plurality of pre-determined reference values; and determine a signal magnitude of the voltage signal suitable for performing demodulation based on the comparison.

20. The circuit of claim 19, further comprising a demodulation circuit communicatively associated with the detection circuit and the control circuit, the demodulation circuit configured to:

amplify the signal magnitude of the voltage signal based on a second reference database, the second reference database comprising a plurality of values for gain parameters corresponding to a plurality of signal magnitudes of the voltage signal; and demodulate the amplified signal magnitude of the voltage signal.

* * * * *